US009187191B1

(12) United States Patent
Jensen et al.

(10) Patent No.: US 9,187,191 B1
(45) Date of Patent: Nov. 17, 2015

(54) STRETCH SKIN RECEPTACLE FOR SPACE OBJECT CAPTURE AND RELEASE

(71) Applicants: Duane Lowell Jensen, Sequim, WA (US); Emin Harutoonian, Irvine, CA (US); Kent Katterheinrich, Shoreview, MN (US)

(72) Inventors: Duane Lowell Jensen, Sequim, WA (US); Emin Harutoonian, Irvine, CA (US); Kent Katterheinrich, Shoreview, MN (US)

( * ) Notice: Subject to any disclaimer, the term of this patent is extended or adjusted under 35 U.S.C. 154(b) by 29 days.

(21) Appl. No.: 14/556,804

(22) Filed: Dec. 1, 2014

(51) Int. Cl.
*B64G 1/64* (2006.01)
*B64G 1/22* (2006.01)

(52) U.S. Cl.
CPC ................ *B64G 1/646* (2013.01); *B64G 1/222* (2013.01)

(58) Field of Classification Search
USPC .......... 244/172.4, 159.2, 158.1, 158.3, 158.9, 244/172.5
See application file for complete search history.

(56) References Cited

U.S. PATENT DOCUMENTS 4,166,598 A * 9/1979 Seifert et al. ............... 244/159.2
6,726,153 B1 * 4/2004 Campbell .................. 244/158.2
7,168,660 B2 * 1/2007 Bischof et al. ............. 244/158.2
7,207,525 B2 * 4/2007 Bischof et al. ............. 244/172.6
7,328,644 B2 * 2/2008 Vickroy ......................... 89/1.11
8,291,941 B1 10/2012 Berardi
8,291,942 B2 10/2012 Berardi
8,479,776 B2 7/2013 Berardi
8,783,622 B2 * 7/2014 Vance ........................ 244/172.4
9,022,323 B2 * 5/2015 Starke et al. ............... 244/158.2
9,033,280 B2 * 5/2015 Bigelow ...................... 244/172.4
2015/0053823 A1 * 2/2015 Bigelow ..................... 244/172.4

OTHER PUBLICATIONS

Co-pending U.S. Appl. No. 14/556,822, filed Dec. 1, 2014, entitled: “Space-Object Ballistic Impact Shield and Elastomeric Gas Pressure Barrier”.

* cited by examiner

*Primary Examiner* — Christopher P Ellis
(74) *Attorney, Agent, or Firm* — Virginia P. Shogren

(57) ABSTRACT

A deployable/retractable expandable bag system for enclosure and release of space objects, constructed from materials exhibiting abrasion resistance and ballistic protection. Pressurized expandable textile trusses support textile membrane materials exhibiting radial contracting or collapsing contracting directional qualities. Stabilizing wires define bag length and minimize rotational forces of the captured object. Upon entry of the space object into the bag system, pressurized gas in trusses is released. The expandable trusses and membranes retract over and onto the space object. The expandable bag may be re-pressurized, and the bag re-opened, for removal and redirection of the space object; upon re-stowing, the system is ready for another capture mission.

20 Claims, 11 Drawing Sheets

STRETCH SKIN RECEPTACLE FOR SPACE OBJECT CAPTURE AND RELEASE

FIELD OF THE INVENTION

The invention relates to an expandable, deployable and retractable bag system for capture of space-based objects for transfer or projection along new trajectories. More particularly, the present invention relates to a compact, low mass apparatus constructed from flexible and expandable truss structures, textiles, and pressure hoses that each flex and extend along specified, differing axes to effectively not only capture, but also pull in space objects for maximum control.

BACKGROUND OF THE INVENTION

In response to the relatively small meteor which broke up near Chelyabinsk, Russia in February 2013 and ongoing investigation of Near Earth Object (NEO) close encounters with earth which could seriously impact life on earth, the U.S. Congress has issued a mandate to the National Aeronautics and Space Administration (NASA) to protect planet Earth. NASA has since issued a Grand Challenge to capture an asteroid, or remove a boulder on a larger asteroid, and return samples to earth in about 2025.

The United Nations also has an international task force to investigate an asteroid re-direct demonstration project, currently planned for 2023. Several businesses are planning to mine asteroids in space. To optimally mine the asteroids, the asteroids may need to be transferred to other locations in space such as the earth-moon Lagrange Point L1 or into an orbit around the moon.

Man-made space-object debris is an additional concern. An estimated 4.4 million pounds of space-object debris are in low-earth orbit. These space objects can be catastrophic for humans and spacecraft. The International Space Station dodges man-made space-object debris each year.

Expandable capture bag concepts to capture an asteroid or other space objects have been promoted by NASA and various private enterprises. While these prior art expandable bags can be stowed somewhat compactly and deployed to a larger size to contain a space object, they typically are constructed from non-expandable/non-stretchable textiles impregnated with an elastomer to form a pressure barrier to contain the pressurized gas.

Expandable/stretchable textile fibers are similar to a coiled spring. The fibers uncoil under tension, and then return to their coiled configuration when the tension is removed. Expandable/stretchable textiles are difficult to impregnate with an elastomer and still allow the textile to expand or stretch. When an elastomer is impregnated into an expandable textile, the elastomer prevents the textile fibers from uncoiling. The result is that the textile becomes essentially non-expandable and non-stretchable.

Prior art capture bag systems utilize non-stretchable pressurization (hose/tube) systems because the impregnated elastomer restricts the textiles' ability to stretch and expand. Consequently, the entire deployed length of the hose or tube must be stowed. The result is a system having a large stowed volume and a relatively high mass.

In addition, the prior art capture bag systems deploy to a large diameter and block sensors onboard the spacecraft used to identify and accurately locate a space object.

Accordingly, there is an as of yet unmet need in the art for a space-object capture apparatus that: 1) is made of components that may be compactly stowed at a size and length significantly less than when deployed; 2) is made of components having a lower combined mass than prior art systems; 3) maintains an adequate pressurized gas barrier without components constructed from non-expandable elastomer-impregnated materials; 4) is constructed using materials that are simultaneously expandable, stretchable, abrasion resistant, and impervious to ballistics; and, 5) upon deployment, continues to allow spacecraft sensors to operate and operators to view space from within the apparatus.

THE INVENTION

Summary of the Invention

The inventive Stretch Skin Receptacle for Space Object Capture and Release of this application comprises an expandable, deployable space object capture and release apparatus for mounting to a spacecraft vehicle, the apparatus deployable from a folded compact stowed position into a bag shape deployed position.

The apparatus comprises:

1) a plurality of truss assemblies, each of the truss assemblies constructed from a flexible, expandable, filament-reinforced generally tubular shaped material. The truss assemblies have a stowed non-pressurized length, a stowed non-pressurized diameter, a deployed pressurized length, a deployed pressurized diameter, and a deployed generally hexagonal ringed shape;

2) a bag attachment assembly of a diameter less than the deployed pressurized diameter of the truss assemblies. The bag attachment assembly is capable of secure attachment of the apparatus to the spacecraft vehicle;

3) a plurality of collapsing membranes generally spanning from the bag attachment assembly at a first end proximate the space vehicle, to a first truss assembly at a second distal end. The collapsing membrane is constructed from a material capable of expansion and retraction in a primary longitudinal direction;

4) a plurality of stretch skin clenching membranes generally spanning from the first truss assembly to an end distal truss assembly, the stretch skin membranes constructed from a material capable of expansion and retraction in a primary radial direction;

5) a plurality of external pressure hose assemblies constructed from hollow collapsible and flexible conduit materials, the hose assemblies in operative combination with the truss assemblies and capable of retaining and transporting a pressurized gas to each of the truss assemblies and capable of operating in a space environment;

6) a protective cover on the bag attachment assembly. The cover opens upon a release of the pressurized gas for a deployment of the truss assemblies into the deployed position; and, 7) at least one pressurized gas container in operative combination with the external pressure hose assemblies upon the deployment of the apparatus.

Each of the truss assemblies, collapsing membranes, stretch skin membranes and external pressure hose assemblies is defined by a respective stowed non-pressurized length and diameter that is at least one half the size of a corresponding deployed pressurized length and diameter.

A method of capturing a space object of interest located in earth-moon orbit or beyond earth-moon orbit comprises the operations of: 1) providing the receptacle as described above; 2) releasing the space vehicle with attached apparatus into earth-moon orbit; 3) maneuvering the space vehicle with attached apparatus to an orbit corresponding to an orbit for the space object of interest; 4) deploying the apparatus to the deployed position; 5) surrounding the space object of interest with the apparatus; 6) retracting the apparatus to the stowed position, thereby: a) causing the stretch skin membranes to retract radially around the space object to retain the space object within the apparatus; and, b) causing the collapsing membranes to retract longitudinally, pulling the space object towards the space vehicle; and, 7) manipulating the space object of interest.

The manipulating step of the method includes: retaining the space object within the apparatus, mining the space object, mining and releasing the space object, scientific examination of the space object, scientific examination and release of the space object, geological examination of the space object, geological examination and release of the space object, movement of the space object to a new orbit further away from earth, movement of the space object to a new orbit further away from earth and release of the space object, movement of the space object towards the earth's surface, movement of the space object towards the earth's surface and release of the space object, release of the space object, deploying the apparatus to release the space object, and, deploying the apparatus to release the space object and stowing the apparatus for future missions.

BRIEF DESCRIPTION OF THE DRAWINGS

The invention is described in more detail with reference to the attached drawings, in which.

DETAILED DESCRIPTION

In general terms, this application discloses a truly stowable and expandable capture bag system for repeated use and effective capture of space objects given a construction entirely out of two types of expandable materials: one material that wraps around the object, and another material which simultaneously pulls the object in closer to the space vehicle for controlled movement.

The apparatus can expand to two or three times its stowed length, and the system is one-third to one-half the mass and stowed volume compared to prior art expandable bag systems. As a result, the apparatus may be launched at a significantly lower cost.

The system utilizes a stretchable/extendable pressure hose system to pressurize expandable trusses. The pressure hose system comprises space-object protection materials. Current stretchable/extendable pressure hoses cannot survive the space-object debris and other space environments.

Once the space object is in the expandable bag, the pressure in the tubes/trusses is removed. The expandable material system begins to retract, capturing the space object within the bag. The expandable bag can be re-pressurized and the bag re-opened to remove and redirect the space object.

Figure 1:
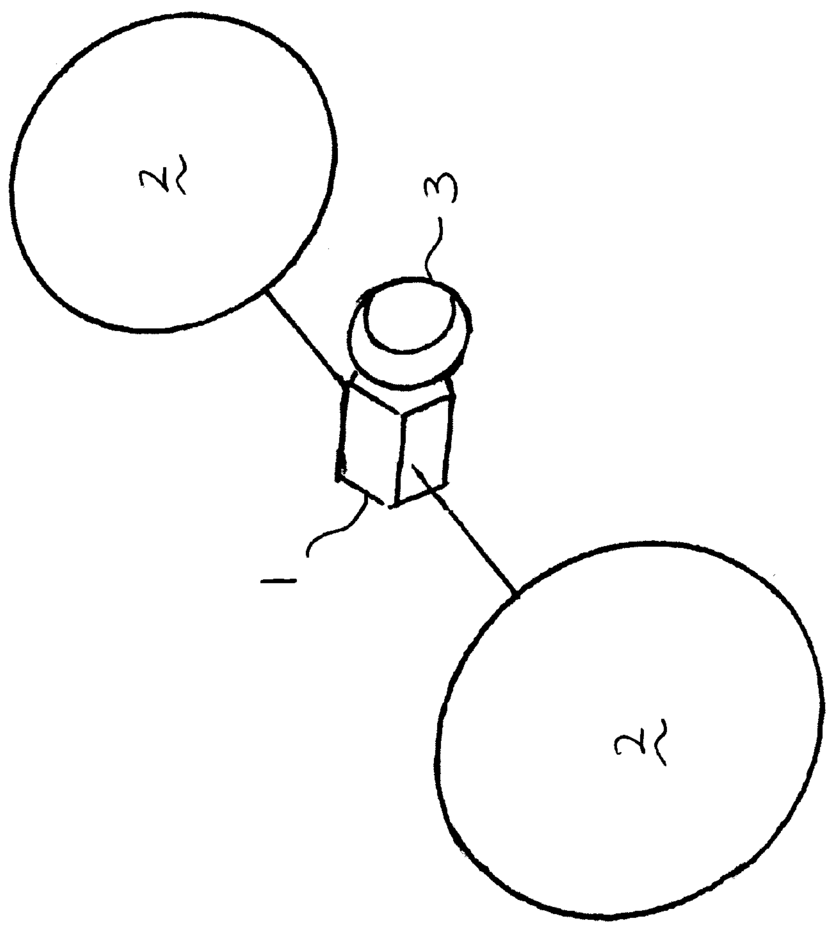
FIG. 1 is isometric perspective view drawing of a spacecraft with a prior art stowed expandable asteroid capture bag in a stowed configuration.

FIG. 1 shows a space vehicle 1 floating in space with a prior art stowed asteroid capture bag 3 in a stowed (non-deployed) configuration. Solar arrays 2 on either side of the vehicle 1 provide power to the space craft 1 and bag system 3.

Figure 2:
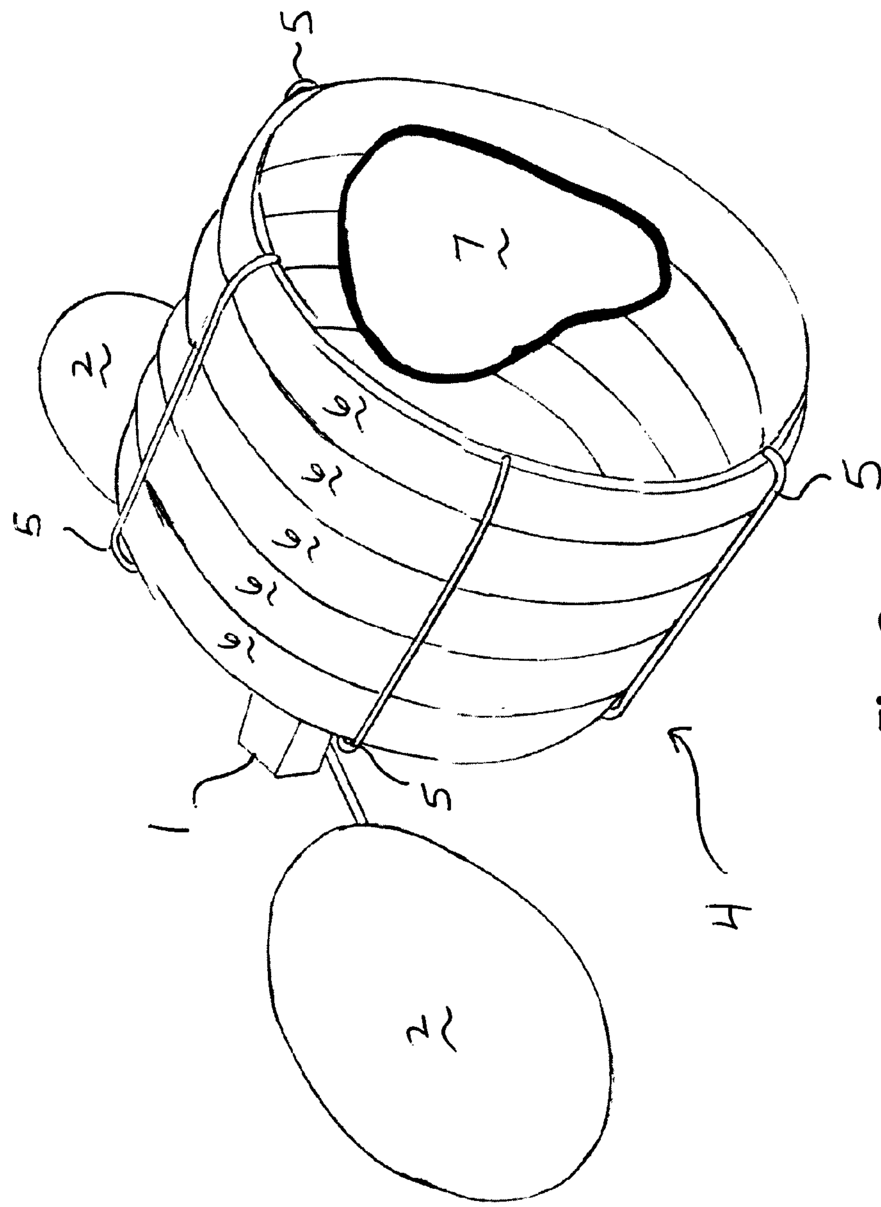
FIG. 2 is an isometric perspective view drawing of a spacecraft with a prior art expandable asteroid capture bag in a deployed configuration.

FIG. 2 shows the prior art bag system 3 of FIG. 1 in a deployed position 4. Referring to FIG. 2, the deployed bag system 4 expands into space via pressurized gas (not shown) carried through a series of pressure hoses 5. The sides of the pressurized bag system 4 form tori 6. The tori 6 are constructed from layered materials forming generally ovoid, circular pockets to retain the pressurized gas.

Referring again to FIG. 2, a space object of interest 7 is shown being surrounded by the prior art deployed bag system 4. As the spacecraft 1 approaches the object of interest 7, the containment bag 3 shown in FIG. 1 is deployed and opened, and the spacecraft 1 signals the expandable bag system 3 to pressurize the expandable bag into the deployed configuration 4. The prior art pressure hoses 5, made of conventional non-stretchable materials, are located around the periphery of the deployed bag. The hoses 5 also provide a restraint system for the inflated bag 4. The prior art hoses 5 cannot withstand ballistic impacts, and are subject to bursting in response to impact forces.

FIG. 2 depicts five expandable tori 6 which are the primary expandable structure members for the expandable bag 4. These tori 6 provide structural support for the bag 4 while also containing the space object 7 when it is in the bag 4. Due to the nature of many space objects 7 as spinning or tumbling when captured, it is likely that the bag 4 must remain pressurized to provide a somewhat rigid structure until the spacecraft's 1 control system can overcome the inertia of the space object 7. Thus, the pressurized bag 4 continues to provide an opening where the space object 7 could possibly be inadvertently ejected from the bag 4, requiring another capture attempt by the spacecraft 1.

Figure 3:
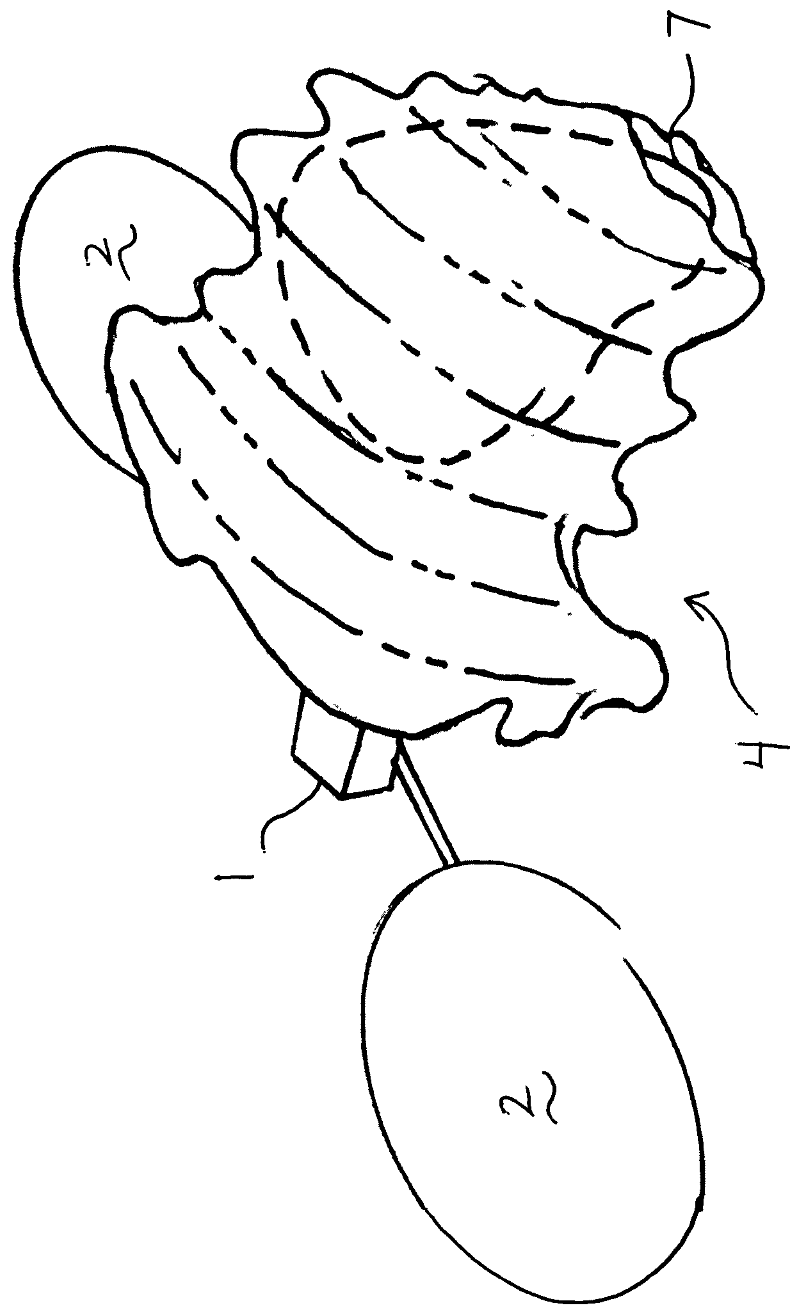
FIG. 3 is an isometric perspective view drawing of a spacecraft with a prior art expandable asteroid capture bag loosely collapsing around a space object after the gas in the expandable bag has been removed.

FIG. 3 shows the prior art expandable bag 4 loosely collapsing around the space object 7 after the gas in the expandable bag 4 has been released. Referring to FIGS. 2 and 3, once the space object 7 is within the bag 4 and the spacecraft 1 has minimized the space object's 7 inertia forces, the gas is released from the tori 6 resulting in the bag 4 loosely collapsing around the space object 7 to capture it. The asteroid 7 may still have a tendency to move, since it is loosely constrained within the collapsed bag 4, introducing additional and undesirable spacecraft 1 control complexities.

Figure 4:
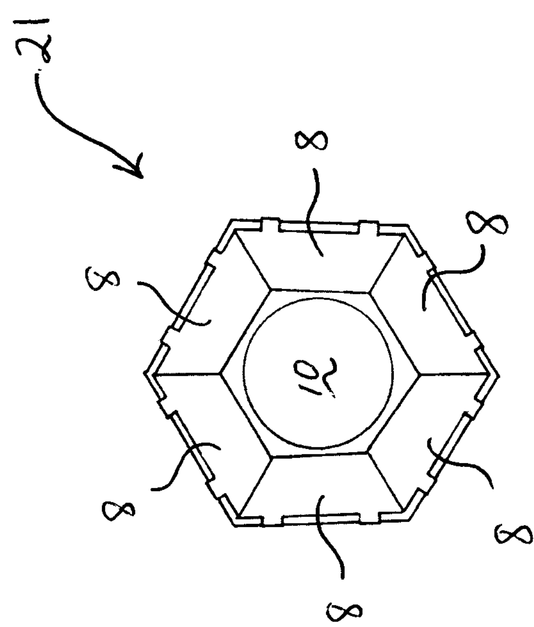
FIG. 4 is a top view perspective drawing of the inventive Stretch Skin Receptacle for Space Object Capture and Release of this application in a stowed position.

FIG. 4 shows a top view perspective of the inventive system in a stowed configuration 21 within a six-sided protective closure 8. The protective closure 8 can be of any suitable or desired geometry, from circular, to a variety of multi-sided enclosures, depending on the geometry of the attached spacecraft 1 (shown in FIGS. 1-3) and the available volume within a launch fairing. The protective closure 8 is attached to the base of the system 21. A central region contains sensors 10 mounted to the spacecraft 1 (shown in FIGS. 1-3) to provide an uninterrupted view of objects in space, both when the system is stowed 21 and when the system is deployed 9 (shown in FIGS. 5-6, infra).

Figure 5:
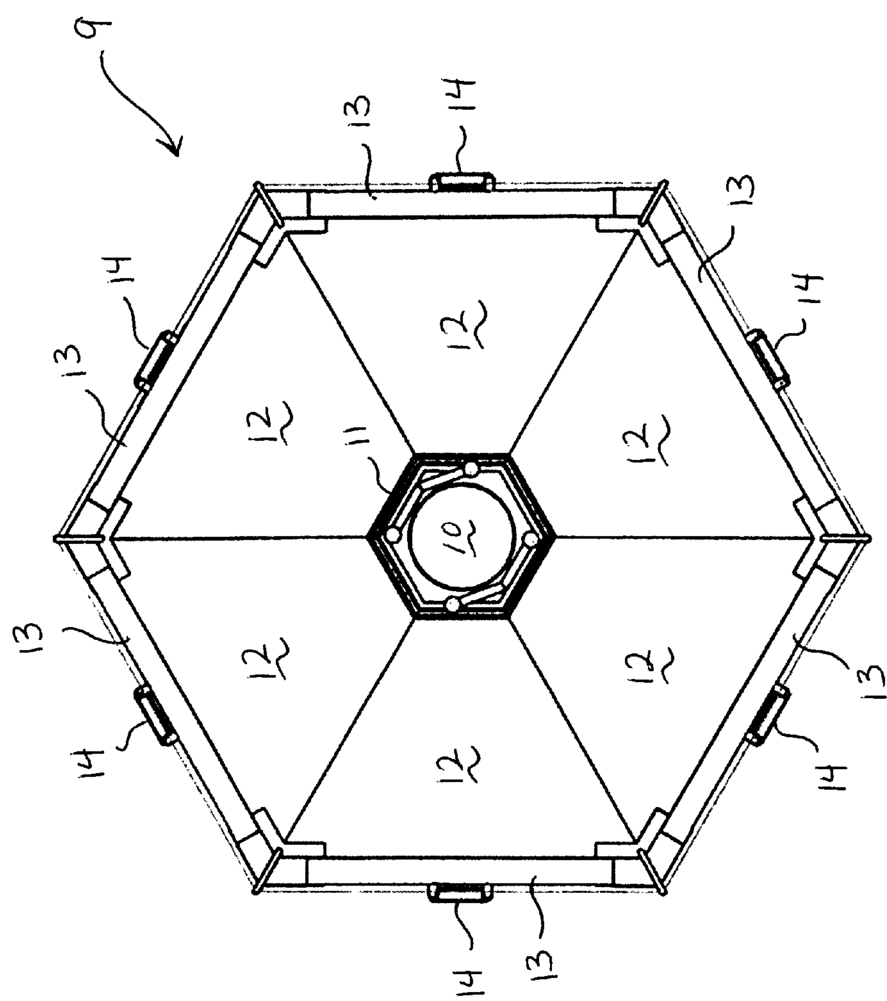
FIG. 5 is a top view perspective drawing of the inventive Stretch Skin Receptacle for Space Object Capture and Release of this application in a deployed position.

FIG. 5 shows a top view perspective of the inventive system in a deployed, generally hexagonal, configuration 9, with the viewer looking into the inflated bag 9. The deployed configuration 9 could also be circular or a variety of multi-sided geometries.

Referring to FIG. 5, the central region contains sensors 10 mounted to the spacecraft 1 (shown in FIGS. 1-3). As shown in FIG. 5, upon deployment, the spacecraft sensors 10 are not blocked by the deployed configuration 9. The present invention is designed and fabricated to allow spacecraft sensors 10, such as microwave and radar, to be centrally located interior of the stowed 21 and deployed 9 expandable bag. In addition, the bag attachment assembly 11 may further comprise an image capturing and transmission device capable of transmitting to an operator a view into space from a perspective inside the apparatus in the deployed position 9.

Referring again to FIG. 5, quadrilateral shaped collapsible membrane panels 12 expand radially from the central region 10 outwards towards the first side-defining truss assembly 13. External pressure hoses 14 carry the pressurized gas (not shown) to the truss assemblies 13 upon deployment.

Figure 6:
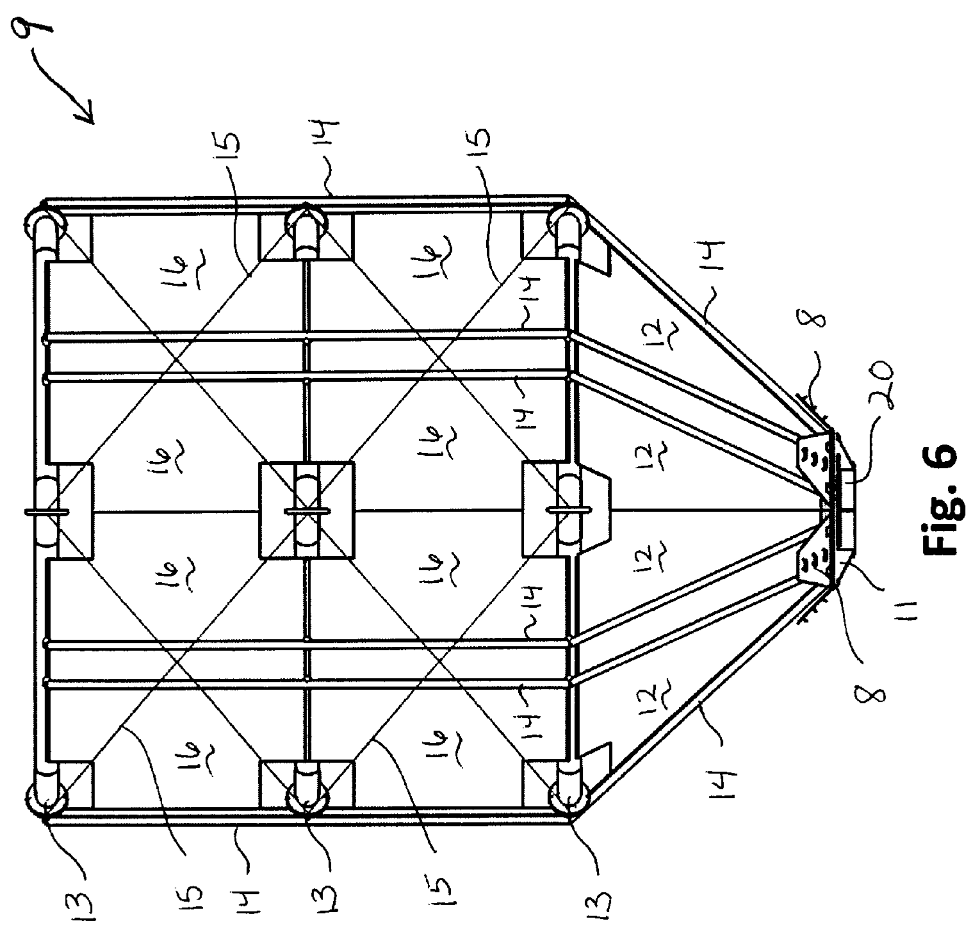
FIG. 6 is a side view drawing of the inventive Stretch Skin Receptacle for Space Object Capture and Release of this application in a deployed position.

FIG. 6 shows a side elevation view of the system in a deployed configuration 9. As shown in FIG. 6, the deployed configuration 9 comprises three rows of expandable truss assemblies 13. The number of rows of expandable truss assemblies 13 may vary, depending on the structural requirements to contain space objects 7 (shown in FIGS. 1-3) of different shapes and lengths.

Referring to FIG. 6, stabilizing wires 15 assist in maintaining the bag geometry when a space object 7 (shown in FIGS. 1-3), which may have some movement, is entering or within the expandable bag system 9. The wires 15 minimize the rotational or tumbling forces of the captured space object 7. The stabilizing wires 15 also assist in constraining the expandable bag system 9 to a desired axial length.

Referring to FIG. 6, the collapsing membrane panels 12 have their preferred fiber alignment oriented in the longitudinal direction of the system 9. The collapsing membranes 12 extend upward from their compactly stowed configuration when tension is applied to the membranes 12. When tension is removed from the membranes 12, the membranes 12 return to their compactly stowed configuration. A portion of the collapsing membranes 12 may be wrapped around the bag attachment assembly 11, on the one hand, and the first truss assembly 13, on the other hand, and retained in position by a filament sewn through the membrane 12 at an area of overlapping membrane 12 materials. Alternately, the collapsing membranes 12 may be secured by any suitable or desired method, including, without limitation: sewing, co-curing, vulcanizing, and adhesive bonding.

Referring again to FIG. 6, a second set of membranes 16, referred to herein as the clenching (or stretch skin) membranes 16, form the upper side walls of the expandable bag system 9. The circumferential clenching membranes 16 have their preferred fiber alignment oriented in the circumferential direction of the expandable bag system 9. The clenching membranes 16 extend outward (radially) from their compactly stowed configuration when tension is applied to the membranes 16. When tension is removed from the membranes 16, the membranes 16 return to their compactly, more centrally-located stowed configuration 21. The clenching membranes 16 may be secured to the truss assemblies 13 by any suitable or desired method, including without limitation: sewing, co-curing, vulcanizing, and adhesive bonding.

Referring again to FIG. 6, the pressure hoses 14 provide a hollow conduit for the passage of pressurized and de-pressurized gases to and from each truss assembly 13. FIG. 6 also depicts the protective cover 8 in its deployed (open) configuration, permitting deployment of the expandable bag system 9 as the pressure hoses 14 fill the expandable truss assemblies with a pressurized gas. The protective cover 8 may be constructed from rigid or flexible materials.

Referring again to FIG. 6, the expandable trusses 13 are fabricated from materials exhibiting abrasion resistance and ballistic protection. In general terms, the truss material comprises: 1) a protective, abrasion-resistant outer layer; and, 2) a textile-based inner layer having an elastomeric barrier applied to one surface to act as a pressure barrier for the gas retained within the truss, and a shear thickening fluid applied to the opposite surface for ballistic protection.

Referring again to FIG. 6, the truss 13 outer layer may be constructed primarily from a polytetrafluoroethylene (PTFE) compound. One or more PTFE layers may be utilized depending on the level of abrasion protection required. The PTFE materials are expandable, similar to Gortex™, to render them capable of stretching and retracting. The inner textile layer is constructed primarily from an aramid compound. The inner layer comprises a stretchable/expandable rugged material conventionally fabricated by braiding, weaving or knitting methods. The textile material exhibits good abrasion and ballistic impact resistance. Kevlar™, Vectran™, PBO™ and Nomex™ are examples. The inner layer has a top surface and an opposing bottom surface. The top surface of the inner layer proximate the outer layer is coated with a shear thickening fluid compound, and the bottom surface of the inner layer is coated with an elastomer compound. The inner layer is capable of a circumferential diameter enlargement in a radial direction of two to three times an original radius when the bottom surface coated with the elastomer is placed under a tension force. Conversely, the inner layer is capable of a self-retraction upon a removal of a tension force applied to the elastomer.

Referring again to FIG. 6, the truss construction provides for axial or circumferential expansion with minimal expansion in the longitudinal direction. Typical extension is two to three times the length of the textile when the tension is removed. Consequently, the expandable truss assemblies 13, when pressurized, expand radially outward to two to three times the diameter of conventional expandable structures using non-stretchable/non-expandable textile/elastomeric materials.

It should be understood that any suitable or desired components of the expandable bag system 9/21 may be constructed using the material system utilized for the trusses 13 to provide sufficient ballistic protection. For example, the pressure hoses 14 may be constructed from a layered material system comprising: 1) a protective, abrasion-resistant outer layer; and, 2) a textile-based inner layer having an elastomeric barrier applied to one surface to act as a gas pressure barrier, and a shear thickening fluid applied to the opposite surface for ballistic protection.

Figure 7C:
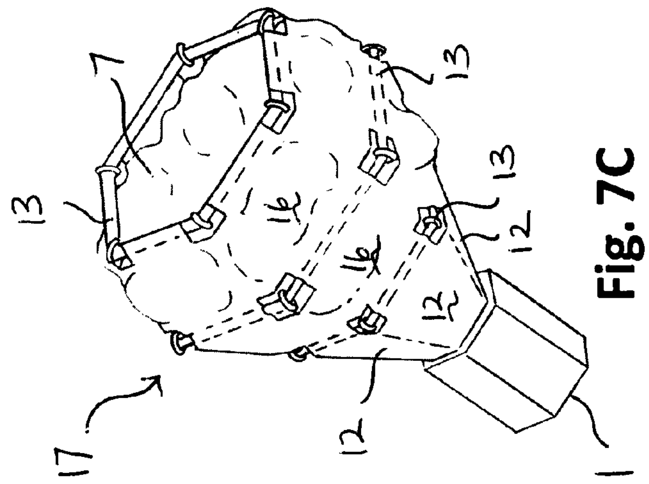
FIGS. 7A-7C are isometric view drawings of the Stretch Skin Receptacle for Space Object Capture and Release in a deployed position approaching, surrounding, and retaining a space object.
Figure 7B:
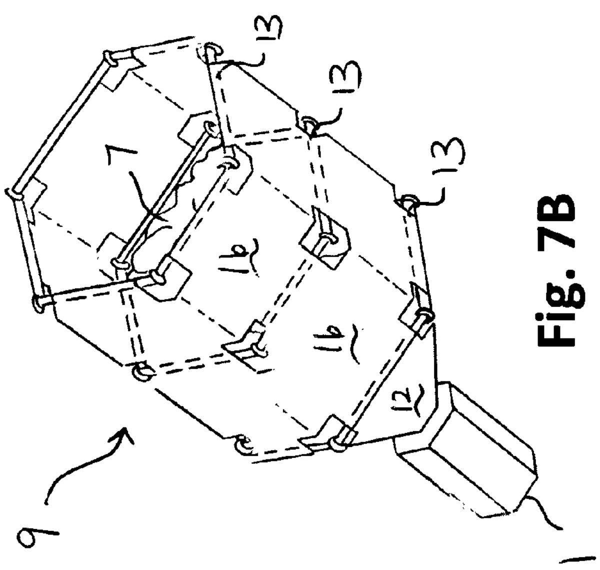
Figure 7A:
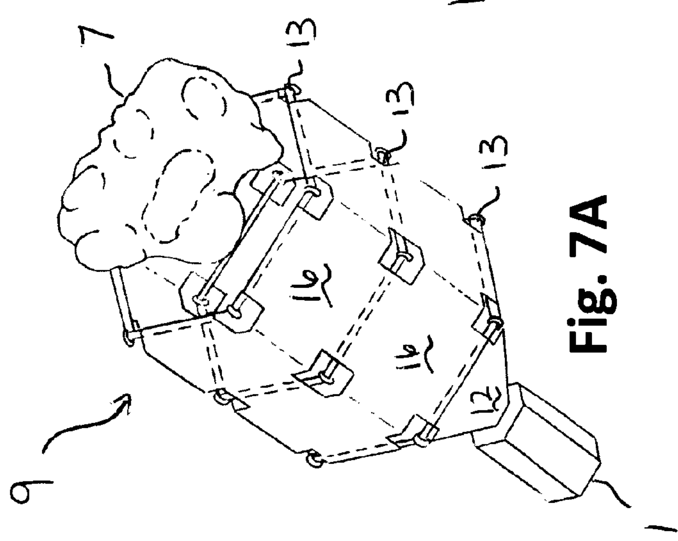

FIGS. 7A through 7C show the expandable bag system in a deployed position 9 maneuvering around a space object 7, and securing the space object 7 in a collapsed position 17. It should be understood that the space vehicle 1 is operable via satellite to earth communication systems (not shown) to move the deployed system 9 around the object of interest 7.

Referring to FIGS. 7A and 7B, as the spacecraft 1 closes in on a space object 7, the expandable bag system is deployed 9. The spacecraft 1 is maneuvered to capture the space object 7.

Referring to FIG. 7C, once the space object 7 is within the expandable bag system 9, the pressure within the expandable bag system 9 is removed. The truss assemblies 13 are no longer in tension since the internal pressure has been removed. The clenching stretch skin membranes 16 coil back into their compact natural state. The truss assemblies 13 self-retract to their unpressurized length which reduces the circumferential opening of the now-collapsed expandable bag system 17. When the truss assemblies 13 self-retract, the tension on the clenching membranes 16 is removed and the membranes 16 self-retract circumferentially inward. The expandable bag system 17 shrinks and conformably wraps around the space object 7. The collapsing membranes 12 also have the tension removed. The collapsing membranes 12 self-retract downward towards where the membranes 12 are attached to the space vehicle 1. The captured space object 7 is pulled closer to the spacecraft 1. The space object 7 is more-closely coupled to the spacecraft 1, improving the spacecraft's 1 ability to control the captured space object 7.

Referring again to FIGS. 1-3 and 6-7C, unlike the expandable capture bag 4 of the prior art where the bag 4 closes loosely around the space object 7 as depicted in FIG. 3, the expandable bag system 17 securely captures the space object 7 due to the self-retracting characteristics of the truss assemblies 13, the collapsing membranes 12, and the clenching stretch skin membranes 16.

In particular, as shown in FIG. 3, the prior art system loosely contains the space object 7 so that the spacecraft 1 and the object 7 act more like independent masses, thereby increasing the complexity of controlling the spacecraft 1. In contrast, referring to FIGS. 6 and 7C, by utilizing the expandable bag system 17 of the present invention, the stretch skin membranes 16 conform to the actual, unique shape of the space object 7, and the space object 7 is more closely coupled to the space vehicle 1 by the contraction of the collapsible membrane panels 12.

Figure 8:
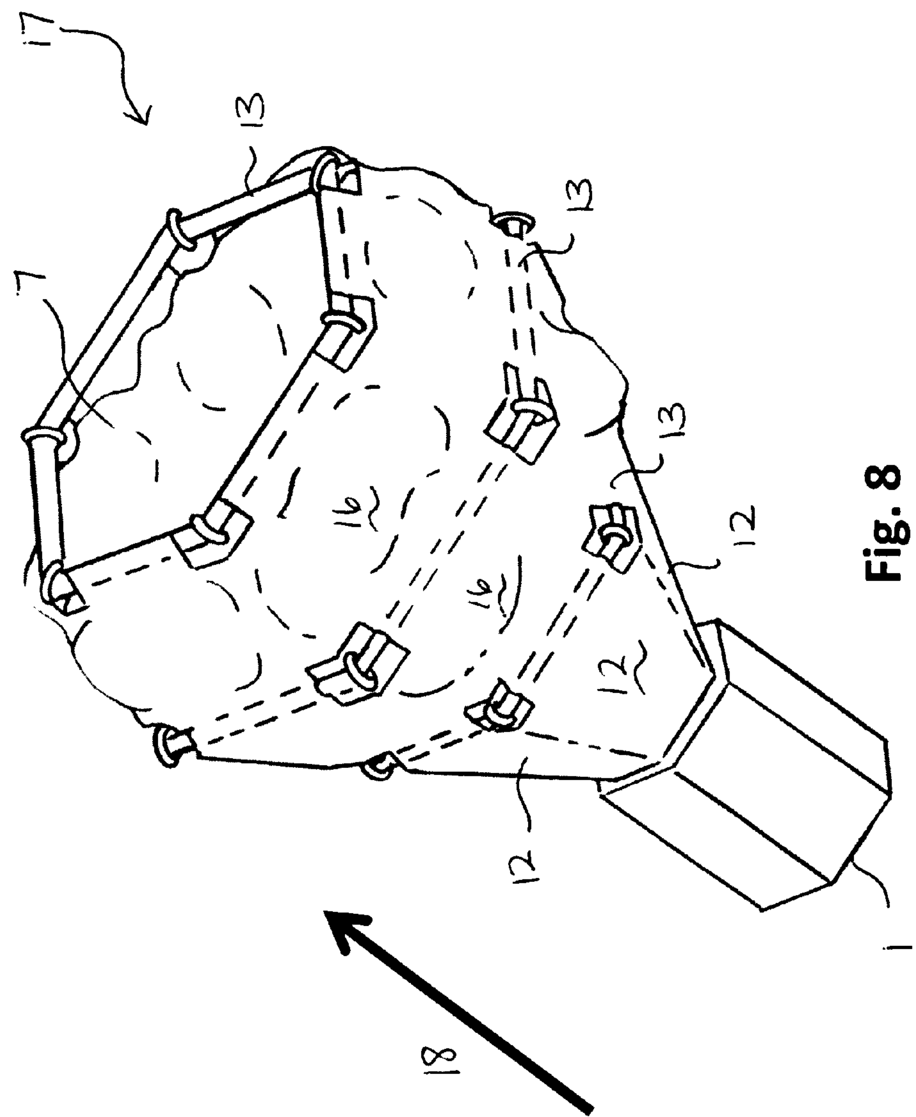
FIG. 8 is a side elevation view drawing of the Stretch Skin Receptacle for Space Object Capture and Release in a deployed position showing a retained space object in transport to a different trajectory.

FIG. 8 shows the spacecraft 1 with the self-retracted expandable bag system 17 wrapped around the captured space object 7 and travelling forward along a line and in the direction of arrow 18 to prepare to redirect and release the space object 7 into a different trajectory.

Figure 9:
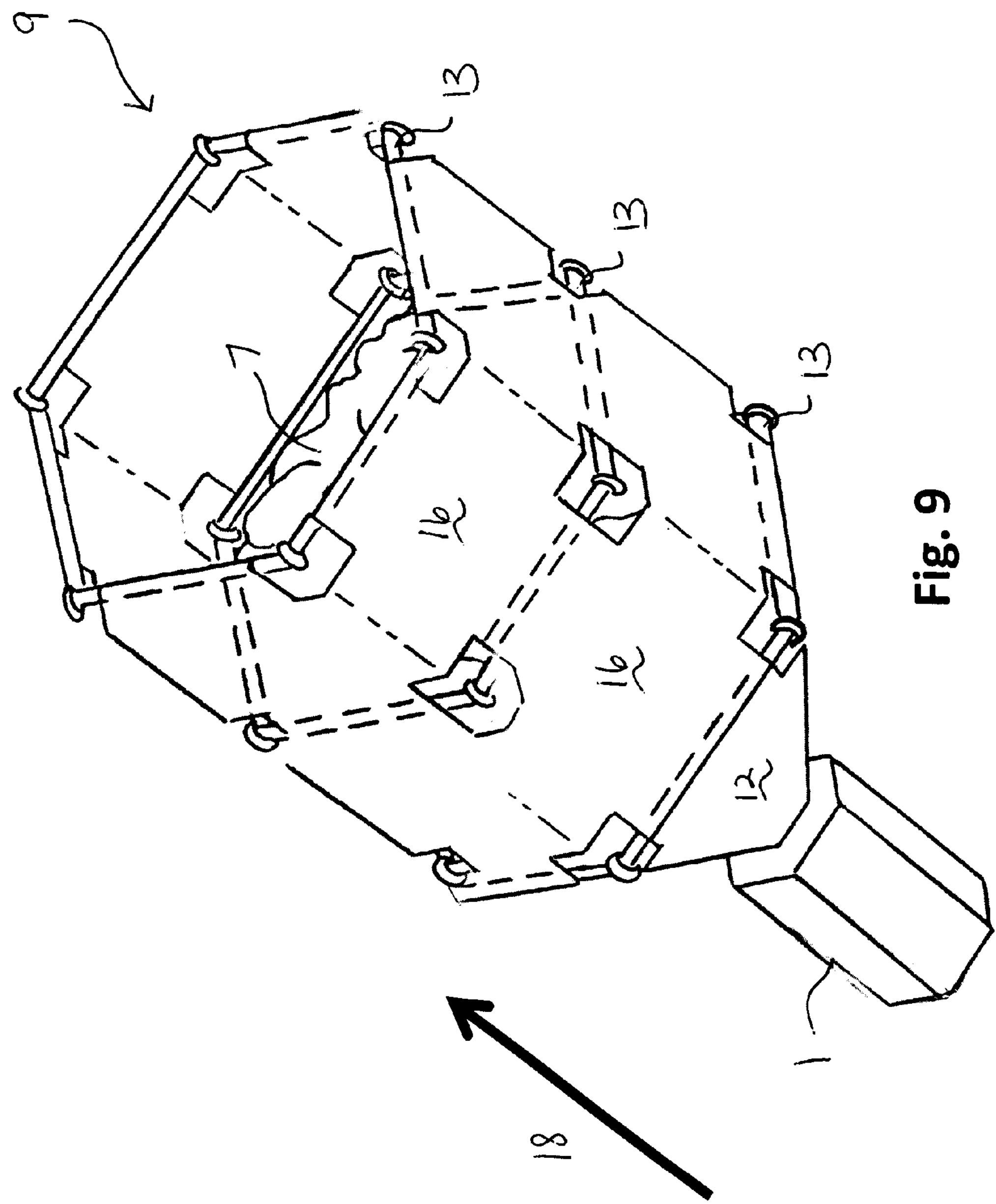
FIG. 9 is a side elevation view drawing of the Stretch Skin Receptacle for Space Object Capture and Release in a re-pressurized and re-opened position with space object still positioned within the apparatus.

FIG. 9 shows the expandable bag system in a re-pressurized and re-opened position 9. The space object 7 is no longer constrained by the expandable bag system as shown in the collapsed position 17 in FIG. 8. The object 7 is floating within the opened bag system 9.

Figure 10:
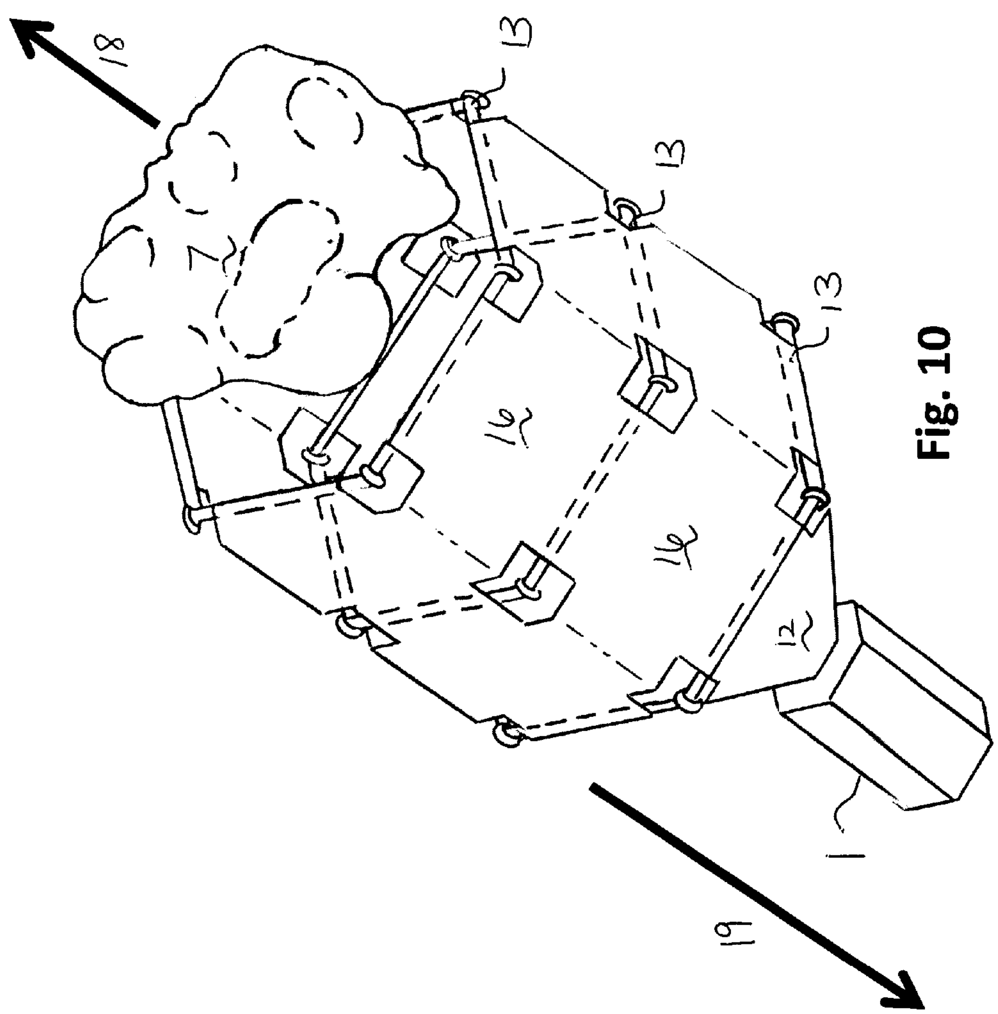
FIG. 10 is a side elevation view drawing of the Stretch Skin Receptacle for Space Object Capture and Release in a re-pressurized and re-opened position backing away from a space object being released; and, FIG. 11 is a side elevation view drawing of the Stretch Skin Receptacle for Space Object Capture and Release in a self-retracted stowed position ready for another mission.

FIG. 10 shows the spacecraft 1 in a reverse trajectory of momentum, as shown along the line and in the direction of arrow 19. As the spacecraft 1 reverses position, the floating space object 7 continues its momentum along the direction of arrow 18.

Figure 11:
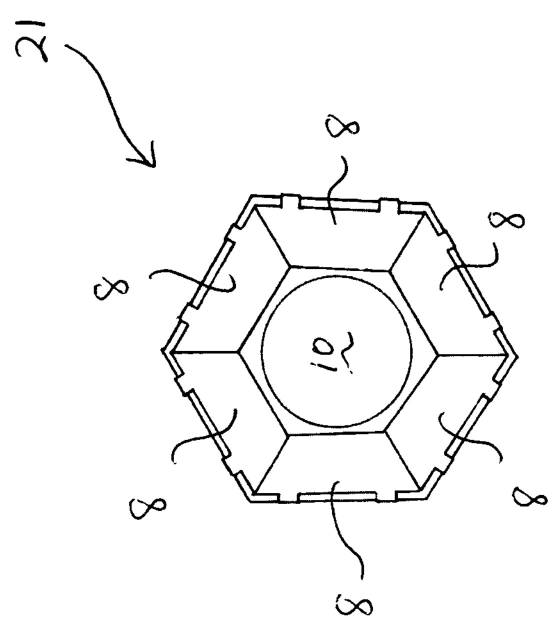

FIG. 11 shows the expandable bag system returned to a de-pressurized, re-stowed position 21 ready for its next space object capture mission. Note that throughout the entire stowed/deployed/re-stowed activities, the spacecraft sensors located proximate the central region of the bag system 10 have had an unrestricted view of the entire mission operation.

Referring to FIGS. 1, and 7A through 11, a method of capturing a space object of interest 7 located in earth-moon orbit may comprise the operations of: 1) providing the inventive apparatus 21 as disclosed herein; 2) releasing a space vehicle 1 with attached apparatus 21 into earth-moon orbit; 3) maneuvering the space vehicle 1 with attached apparatus 21 to an orbit corresponding to an orbit for the space object of interest 7; 4) deploying the apparatus to the deployed position 9; 5) surrounding the space object of interest 7 within the apparatus 9; 6) retracting the apparatus to the stowed position 17, thereby causing the clenching membranes 16 to retract radially around the space object 7, thereby retaining the space object 7 within the apparatus 17, and causing the collapsing membranes 12 to retract longitudinally, thereby pulling the space object 7 inwards towards the space vehicle 1.

Once the space object 7 is retained within the collapsed system 17, the object 7 may be manipulated. The manipulating step may include: retaining the space object within the apparatus, mining the space object, mining and releasing the space object, scientific examination of the space object, scientific examination and release of the space object, geological examination of the space object, geological examination and release of the space object, movement of the space object to a new orbit further away from earth, movement of the space object to a new orbit further away from earth and release of the space object, movement of the space object towards the earth's surface, movement of the space object towards the earth's surface and release of the space object, release of the space object, deploying the apparatus to release the space object, and, deploying the apparatus to release the space object and stowing the apparatus for the next mission.

Referring again to FIGS. 1, and 7A through 11, the apparatus may also be utilized to capture an object, such as a boulder, from the surface of an asteroid. The method of capturing a boulder from the surface of an asteroid located in an earth-moon orbit comprises the operations of: 1) providing the inventive Stretch Skin Receptacle apparatus 21 as disclosed herein; 2) releasing a space vehicle 1 with attached apparatus 21 into earth-moon orbit; 3) maneuvering the space vehicle 1 with attached apparatus 21 to an orbit corresponding to an orbit for the asteroid; 4) deploying the apparatus to the deployed position 9; 5) surrounding a boulder 7 on the asteroid in the apparatus 9; 6) retracting the apparatus to the stowed position 17, thereby causing the clenching membranes 16 to retract radially around the boulder 7, thereby retaining the boulder 7 within the apparatus 17, and causing the collapsing membranes 12 to retract longitudinally, thereby pulling the boulder 7 inwards towards the space vehicle 1.

For both methods disclosed herein, once the object of interest 7 has been released, the apparatus may be re-configured to the stowed position 21 while the space vehicle 1 is moved in the direction of another object of interest 7.

The inventive Stretch Skin Receptacle for Space Object Capture and Release of this application has wide applicability to the space industry, namely to provide a low-cost, re-usable, reliable, and controllable method for capturing and releasing space objects 7. The inventive system 21 may be compactly stowed adjacent to the upper portion of a spacecraft 1, while the spacecraft 1 is attached to a launch vehicle and also while the spacecraft 1 is travelling independently to the space-object of interest 7. When the spacecraft 1 approaches a space-object of interest 7, the expandable bag system 9 is pressurized via a pressurization system. The expandable/stretchable pressure hoses 14 pressurize the expandable trusses 13 via a pressurized gas canister 20, and also provide the restraint system to contain the deployed bag 9 at a desired axial length from the base 11.

It should be understood that various modifications within the scope of this invention can be made by one of ordinary skill in the art without departing from the spirit thereof and without undue experimentation. For example, the expandable bag capture system 21 may be designed, fabricated and assembled as a modular unit to facilitate removal of worn units from the spacecraft 1 and installation of new units by either humans or robotic spacecraft while in space.

The base structure 11 may feature quick-release mechanisms for the purpose of quickly, easily and reliably removing the expandable bag capture system from the spacecraft 1 while in space. In this embodiment, the base portion 11 of the expandable bag system 21 is not removed, only the bag portion itself at its structural interface to the base portion 11.

Any suitable or desired pressurized gas vessel(s) 20 may be utilized. Ideally, the gas canisters 20 are of sufficient capacity to provide multiple deployments of the expandable bag capture system 9. An optional accumulator system would allow the gas to be collected for reuse.

This invention is therefore to be defined as broadly as the prior art will permit, and in view of the specification if need be, including a full range of current and future equivalents thereof.

We claim:

1. An expandable, deployable space object capture and release apparatus for mounting to a spacecraft vehicle, said apparatus deployable from a folded compact stowed position into a bag shape deployed position, said apparatus comprising:

a plurality of truss assemblies, each of said truss assemblies constructed from a flexible, expandable, filament-reinforced generally tubular shaped material; each of said truss assemblies capable of exhibiting a stowed non-pressurized length, a stowed non-pressurized diameter, a deployed pressurized length, a deployed pressurized diameter, and a deployed generally hexagonal ringed shape;

a bag attachment assembly of a diameter less than the deployed pressurized diameter of the truss assemblies, said bag attachment assembly capable of secure attachment of the apparatus to the spacecraft vehicle;

a plurality of collapsing membranes generally spanning from the bag attachment assembly at a first end proximate the space vehicle, to a first truss assembly at a second distal end, the collapsing membranes constructed from a material capable of expansion and retraction in a primary longitudinal direction;

a plurality of clenching membranes generally spanning between each of the truss assemblies, said clenching membranes constructed from a material capable of expansion and retraction in a primary radial direction;

a plurality of external pressure hoses constructed from hollow collapsible and flexible conduit materials, said hose assemblies in operative combination with the truss assemblies and capable of retaining and transporting a pressurized gas to each of the truss assemblies;

a protective cover on the bag attachment assembly, said cover opened upon a release of the pressurized gas for a deployment of the truss assemblies into the deployed position;

at least one pressurized gas container, said container in operative combination with the external pressure hoses upon the deployment of the apparatus;

wherein each of said truss assemblies, collapsing membranes, clenching membranes and external pressure hoses is defined by a respective stowed non-pressurized length and diameter that is at least one half the size of a corresponding deployed pressurized length and diameter.

2. The apparatus claim 1, further comprising a plurality of stabilizing wires generally spanning the truss assemblies and forming a pattern of cross diagonals when the apparatus is in the deployed position.

3. The apparatus of claim 1, wherein the bag attachment assembly further comprises an image capturing and transmission device capable of transmitting to an operator a view into space from a perspective inside the apparatus in the deployed position.

4. The apparatus of claim 1, wherein the truss assembly material comprises an outer layer constructed primarily from a polytetrafluoroethylene compound, and an inner layer constructed primarily from an aramid compound, said inner layer having a top surface and an opposing bottom surface, the top surface coated with a shear thickening fluid compound, and the bottom surface coated with an elastomer compound.

5. The apparatus of claim 1, wherein the truss assembly material comprises an outer layer constructed primarily from a polytetrafluoroethylene compound, and an inner layer constructed primarily from an aramid compound, said inner layer having a top surface and an opposing bottom surface, the top surface coated with a shear thickening fluid compound, and the bottom surface coated with an elastomer compound, and wherein the inner layer is capable of a circumferential diameter enlargement in a radial direction of two to three times an original radius when the bottom surface coated with the elastomer is placed under a tension force.

6. The apparatus of claim 1, wherein the truss assembly material comprises an outer layer constructed primarily from a polytetrafluoroethylene compound, and an inner layer constructed primarily from an aramid compound, said inner layer having a top surface and an opposing bottom surface, the top surface coated with a shear thickening fluid compound, and the bottom surface coated with an elastomer compound, and wherein the inner layer is capable of a self-retraction upon a removal of a tension force applied to the elastomer.

7. The apparatus of claim 1, wherein a portion of the collapsing membrane is wrapped around the bag attachment assembly, on the one hand, and the first truss assembly, on the other hand, and retained in position by a filament sewn through the membrane at an area of overlapping membrane materials.

8. The apparatus of claim 1, wherein a portion of the collapsing membrane is secured to the bag attachment assembly, on the one hand, and the first truss assembly, on the other hand, by a method chosen from the group consisting of: sewing, co-curing, vulcanizing, and adhesive bonding.

9. The apparatus of claim 1, wherein a portion of the clenching membrane is secured to the truss assemblies by a method chosen from the group consisting of: sewing, co-curing, vulcanizing, and adhesive bonding.

10. A method of capturing a space object of interest located in earth-moon orbit comprising operations of:

Providing an expandable, deployable space object capture and release apparatus for mounting to a spacecraft vehicle, said apparatus deployable from a folded compact stowed position into a bag shape deployed position, said apparatus comprising:

a plurality of truss assemblies, each of said truss assemblies constructed from a flexible, expandable, filament-reinforced generally tubular shaped material; each of said truss assemblies capable of exhibiting a stowed non-pressurized length, a stowed non-pressurized diameter, a deployed pressurized length, a deployed pressurized diameter, and a deployed generally hexagonal ringed shape;

a bag attachment assembly of a diameter less than the deployed pressurized diameter of the truss assemblies, said bag attachment assembly capable of secure attachment of the apparatus to the spacecraft vehicle;

a plurality of collapsing membranes generally spanning from the bag attachment assembly at a first end proximate the space vehicle, to a first truss assembly at a second distal end, the collapsing membranes constructed from a material capable of expansion and retraction in a primary longitudinal direction;

a plurality of clenching membranes generally spanning between each of the truss assemblies, said clenching membranes constructed from a material capable of expansion and retraction in a primary radial direction;

a plurality of external pressure hoses constructed from hollow collapsible and flexible conduit materials, said hose ladder assemblies in operative combination with the truss assemblies and capable of retaining and transporting a pressurized gas to each of the truss assemblies;

a protective cover on the bag attachment assembly, said cover opened upon a release of the pressurized gas for a deployment of the truss assemblies into the deployed position;

at least one pressurized gas container, said container in operative combination with the external pressure hoses upon the deployment of the apparatus;

wherein each of said truss assemblies, collapsing membranes, clenching membranes and external pressure hoses is defined by a respective stowed non-pressurized length and diameter that is at least one half the size of a corresponding deployed pressurized length and diameter;

Releasing the space vehicle with attached apparatus into earth-moon orbit;

Maneuvering the space vehicle with attached apparatus to an orbit corresponding to an orbit for the space object of interest;

Deploying the apparatus to the deployed position;

Surrounding the space object of interest with the apparatus;

Retracting the apparatus to the stowed position, thereby causing the clenching membranes to retract radially around the space object, thereby retaining the space object within the apparatus, and causing the collapsing membranes to retract longitudinally, thereby pulling the space object inwards towards the space vehicle; and, Manipulating the space object of interest.

11. The method of claim 10, further comprising the steps of:

Moving the space vehicle in a first trajectory;

Deploying the apparatus to release the space object; and,

Moving the space vehicle in a second, reverse trajectory away from the space object.

12. The method of claim 10, wherein the manipulating step comprises actions selected from the group consisting of: retaining the space object within the apparatus, mining the space object, mining and releasing the space object, scientific examination of the space object, scientific examination and release of the space object, geological examination of the space object, geological examination and release of the space object, movement of the space object to a new orbit further away from earth, movement of the space object to a new orbit further away from earth and release of the space object, movement of the space object towards the earth's surface, movement of the space object towards the earth's surface and release of the space object, release of the space object, deploying the apparatus to release the space object, and, deploying the apparatus to release the space object and stowing the apparatus.

13. The method of claim 10, wherein the apparatus further comprises a plurality of stabilizing wires generally spanning the truss assemblies and forming a pattern of cross diagonals when the apparatus is in the deployed position.

14. The method of claim 10, wherein the bag attachment assembly further comprises an image capturing and transmission device capable of transmitting to an operator a view into space from a perspective inside the apparatus in the deployed position.

15. The method of claim 10, wherein the truss assembly material comprises an outer layer constructed primarily from a polytetrafluoroethylene compound, and an inner layer constructed primarily from an aramid compound, said inner layer having a top surface and an opposing bottom surface, the top surface coated with a shear thickening fluid compound, and the bottom surface coated with an elastomer compound, and wherein the inner layer is capable of a circumferential diameter enlargement in a radial direction of two to three times an original radius when the bottom surface coated with the elastomer is placed under a tension force.

16. A method of capturing a boulder from the surface of an asteroid located in an earth-moon orbit or beyond earth-moon orbit comprising operations of:

Providing an expandable, deployable space object capture and release apparatus for mounting to a spacecraft vehicle, said apparatus deployable from a folded compact stowed position into a bag shape deployed position, said apparatus comprising:

a plurality of truss assemblies, each of said truss assemblies constructed from a flexible, expandable, filament-reinforced generally tubular shaped material; each of said truss assemblies capable of exhibiting a stowed non-pressurized length, a stowed non-pressurized diameter, a deployed pressurized length, a deployed pressurized diameter, and a deployed generally hexagonal ringed shape;

a bag attachment assembly of a diameter less than the deployed pressurized diameter of the truss assemblies, said bag attachment assembly capable of secure attachment of the apparatus to the spacecraft vehicle;

a plurality of collapsing membranes generally spanning from the bag attachment assembly at a first end proximate the space vehicle, to a first truss assembly at a second distal end, the collapsing membranes constructed from a material capable of expansion and retraction in a primary longitudinal direction;

a plurality of clenching membranes generally spanning between each of the truss assemblies, said clenching membranes constructed from a material capable of expansion and retraction in a primary radial direction;

a plurality of external pressure hoses constructed from hollow collapsible and flexible conduit materials, said hose assemblies in operative combination with the truss assemblies and capable of retaining and transporting a pressurized gas to each of the truss assemblies and capable of operating in a space environment;

a protective cover on the bag attachment assembly, said cover opened upon a release of the pressurized gas for a deployment of the truss assemblies into the deployed position;

at least one pressurized gas container, said container in operative combination with the external pressure hoses upon the deployment of the apparatus;

wherein each of said truss assemblies, collapsing membranes, clenching membranes and external pressure hoses is defined by a respective stowed non-pressurized length and diameter that is at least one half the size of a corresponding deployed pressurized length and diameter;

Releasing the space vehicle with attached apparatus into the earth-moon orbit;

Maneuvering the space vehicle with attached apparatus to an orbit corresponding to the asteroid;

Deploying the apparatus to the deployed position;

Surrounding the boulder within the apparatus;

Retracting the apparatus to the stowed position, thereby causing the clenching membranes to retract radially around the boulder, thereby retaining the boulder within the apparatus, and causing the collapsing membranes to retract longitudinally on the boulder, thereby pulling the boulder inwards towards the space vehicle; and, Manipulating the boulder.

17. The method of claim 16, further comprising the steps of:

Moving the space vehicle in a first trajectory;

Deploying the apparatus to release the boulder; and,

Moving the space vehicle in a second, reverse trajectory away from the boulder.

18. The method of claim 16, wherein the manipulating step comprises actions selected from the group consisting of: retaining the space object within the apparatus, mining the space object, mining and releasing the space object, scientific examination of the space object, scientific examination and release of the space object, geological examination of the space object, geological examination and release of the space object, movement of the space object to a new orbit further away from earth, movement of the space object to a new orbit further away from earth and release of the space object, movement of the space object towards the earth's surface, movement of the space object towards the earth's surface and release of the space object, release of the space object, deploying the apparatus to release the space object, and, deploying the apparatus to release the space object and stowing the apparatus.

19. The method of claim 16, wherein the apparatus further comprises an image capturing and transmission device capable of transmitting to an operator a view into space from a perspective inside the apparatus in the deployed position.

20. The method of claim 16, wherein the truss assembly material comprises an outer layer constructed primarily from a polytetrafluoroethylene compound, and an inner layer constructed primarily from an aramid compound, said inner layer having a top surface and an opposing bottom surface, the top surface coated with a shear thickening fluid compound, and the bottom surface coated with an elastomer compound, and wherein the inner layer is capable of a circumferential diameter enlargement in a radial direction of two to three times an original radius when the bottom surface coated with the elastomer is placed under a tension force.

* * * * *